United States Patent
Lu et al.

(10) Patent No.: US 12,294,519 B2
(45) Date of Patent: May 6, 2025

(54) PACKET PROCESSING DEVICE AND PACKET PROCESSING METHOD

(71) Applicant: Realtek Semiconductor Corporation, Hsinchu (TW)

(72) Inventors: Kuo Cheng Lu, Hsinchu (TW); Chun-Ming Liu, Hsinchu (TW); Sheng Wen Lo, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 220 days.

(21) Appl. No.: 18/182,386

(22) Filed: Mar. 13, 2023

(65) Prior Publication Data

US 2024/0064102 A1 Feb. 22, 2024

(30) Foreign Application Priority Data

Aug. 18, 2022 (TW) .................................. 111131172

(51) Int. Cl.
*H04L 47/12* (2022.01)
*H04L 47/24* (2022.01)

(52) U.S. Cl.
CPC .............. *H04L 47/12* (2013.01); *H04L 47/24* (2013.01)

(58) Field of Classification Search
CPC ........ H04L 47/129; H04L 47/12; H04L 47/24
See application file for complete search history.

(56) References Cited

U.S. PATENT DOCUMENTS

| 9,277,452 | B1* | 3/2016 | Aithal | H04L 47/24 |
| 2012/0327768 | A1* | 12/2012 | Sarwar | H04L 47/2408 370/230.1 |
| 2016/0128079 | A1* | 5/2016 | Verma | H04W 8/04 370/329 |
| 2019/0342199 | A1 | 11/2019 | Hurson et al. | |
| 2021/0021545 | A1 | 1/2021 | Srivastava et al. | |
| 2021/0320866 | A1* | 10/2021 | Le | H04L 47/115 |

* cited by examiner

*Primary Examiner* — Rachel J Hackenberg
(74) *Attorney, Agent, or Firm* — CKC & Partners Co., LLC

(57) ABSTRACT

A first packet flow and a second packet flow support a first protocol, a third packet flow and a fourth packet flow support a second protocol, and a priority of the first protocol is lower than a priority of the second protocol. The first packet flow and the third packet flow are transmitted from a first ingress port to a first egress port. The second packet flow and the fourth packet flow are transmitted from a second ingress port to a second egress port. When the packet processing device is in a congested state, a bandwidth modulator performs a first suppression process on the first packet flow at the first ingress port, and the bandwidth modulator performs a second suppression process on the second packet flow at the second egress port or on the third packet flow at the first ingress port.

18 Claims, 2 Drawing Sheets

F1, F2 : File Transfer Protocol (FTP)
F3, F4 : Voice over Internet Protocol (VoIP)

F1, F2 : File Transfer Protocol (FTP)
F3, F4 : Voice over Internet Protocol (VoIP)

PACKET PROCESSING DEVICE AND PACKET PROCESSING METHOD

RELATED APPLICATIONS

This application claims priority to Taiwanese Application Serial Number 111131172, filed Aug. 18, 2022, which is herein incorporated by reference.

BACKGROUND

Technical Field

The present disclosure relates to packet processing technology. More particularly, the present disclosure relates to a packet processing device and a packet processing method.

Description of Related Art

With developments of technology, various network technologies have been developed. However, when the network is excessively congested, users have worse experience. In current methods, bandwidth modulators can be used to solve the aforementioned problems. However, the bandwidth modulators in the current methods have some disadvantages and need to be improved.

SUMMARY

Some aspects of the present disclosure are to provide a packet processing device. The packet processing device includes a first ingress port, a second ingress port, a first egress port, a second egress port, and a bandwidth modulator. A first packet flow and a second packet flow support a first protocol, a third packet flow and a fourth packet flow support a second protocol, and a priority of the first protocol is lower than a priority of the second protocol. The first packet flow and the third packet flow are transmitted from the first ingress port to the first egress port. The second packet flow and the fourth packet flow are transmitted from the second ingress port to the second egress port. When the packet processing device is in a congested state, the bandwidth modulator performs a first suppression process on the first packet flow at the first ingress port, and the bandwidth modulator performs a second suppression process on the second packet flow at the second egress port or on the third packet flow at the first ingress port.

Some aspects of the present disclosure are to provide a packet processing method. The packet processing method is applied to a packet processing device. The packet processing device includes a first ingress port, a second ingress port, a first egress port, and a second egress port. A first packet flow and a second packet flow support a first protocol, a third packet flow and a fourth packet flow support a second protocol, and a priority of the first protocol is lower than a priority of the second protocol. The first packet flow and the third packet flow are transmitted from the first ingress port to the first egress port, and the second packet flow and the fourth packet flow are transmitted from the second ingress port to the second egress port. The packet processing method includes following operations: performing, by a bandwidth modulator in the packet processing device, a first suppression process on the first packet flow at the first ingress port when the packet processing device is in a congested state; and performing, by the bandwidth modulator, a second suppression process on the second packet flow at the second egress port or on the third packet flow at the first ingress port.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
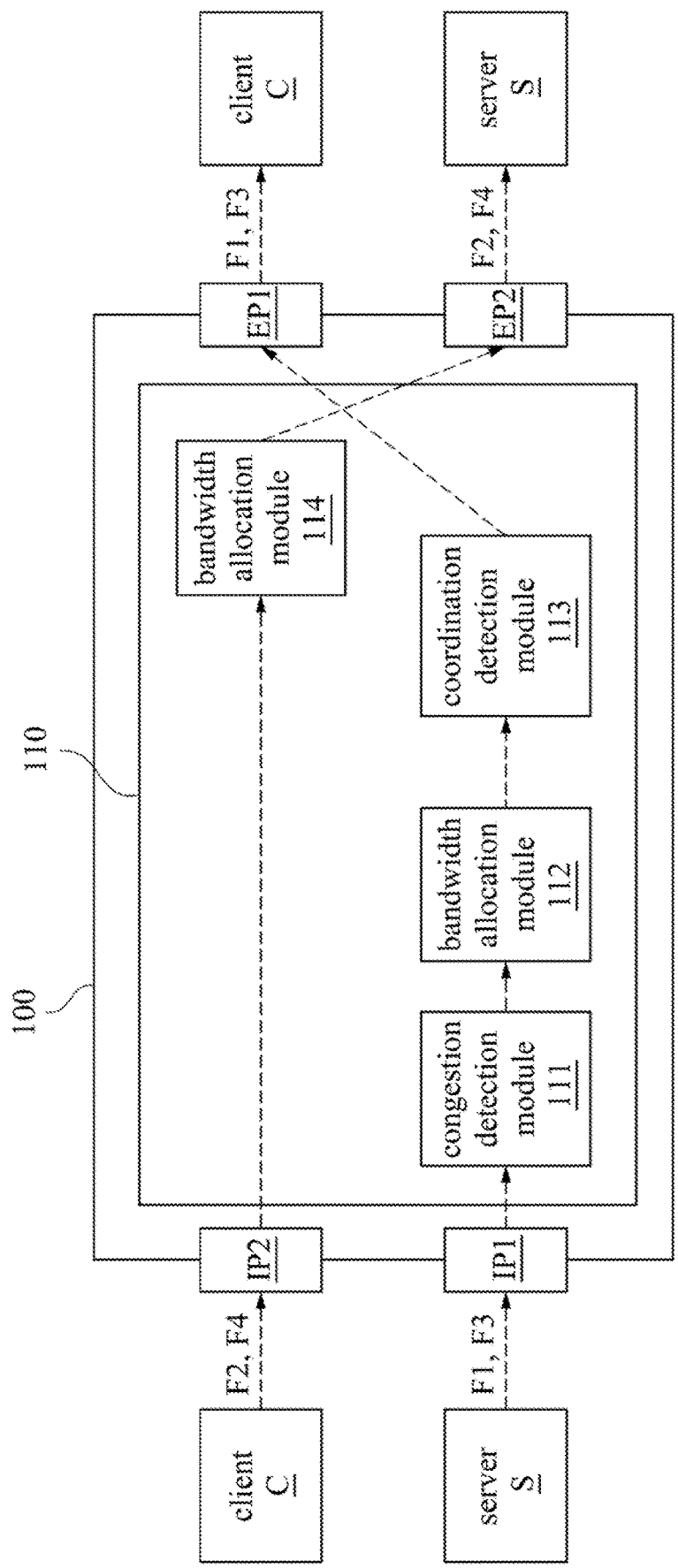
FIG. 1 is a schematic diagram of a packet processing device according to some embodiments of the present disclosure.

Reference is made to FIG. 1. FIG. 1 is a schematic diagram of a packet processing device 100 according to some embodiments of the present disclosure. The packet processing device 100 can be a router or a switch, or be disposed in a router or in a switch. The packet processing device 100 can be used to solve network congested problems.

As illustrated in FIG. 1, the packet processing device 100 includes an ingress port IP1, an ingress port IP2, an egress port EP1, an egress port EP2, and a bandwidth modulator 110.

In this example, the ingress port IP1 coupled to a server S is a Wide Area Network (WAN) port and the egress port EP1 coupled to a client C is a Local Area Network (LAN) port. A packet flow F1 and a packet flow F3 from the server S can be transmitted to the client C through the ingress port IP1, the bandwidth modulator 110, and the egress port EP1 sequentially. The ingress port IP2 coupled to the client C is a LAN port and the egress port EP2 coupled to the server S is a WAN port. A packet flow F2 and a packet flow F4 from the client C can be transmitted to the server S through the ingress port IP2, the bandwidth modulator 110, and the egress port EP2 sequentially. However, the present disclosure is not limited to the examples above.

In some embodiments, the packet flow F1 and the packet flow F2 support a first protocol, the packet flow F3 and the packet flow F4 support a second protocol, and a priority of the first protocol is lower than a priority of the second protocol. In this example, the packet flow F1 and the packet flow F2 support the File Transfer Protocol (FTP), the packet flow F3 and the packet flow F4 support the Voice over Internet Protocol (VoIP), and the priority of the FTP is lower than the priority of the VoIP. The FTP and the Voice over Internet Protocol are request-reply protocols. In the request-reply architecture, the client C can send a request to the server S. In response to a proper request, the server S sends a reply to the client C. However, the present disclosure is not limited to the FTP and the VoIP. For example, the HyperText Transfer Protocol (HTTP) is also a request-reply protocol.

As illustrated in FIG. 1, the bandwidth modulator 110 includes a congestion detection module 111, a bandwidth allocation module 112, a coordination detection module 113, and a bandwidth allocation module 114. In some embodiments, the bandwidth modulator 110 can be implemented by hardware circuits (e.g., a processor) with software programs (stored in a memory). For example, the processor can perform the program code in the memory to perform functions of the congestion detection module 111, the bandwidth allocation module 112, the coordination detection module 113 and the bandwidth allocation module 114.

In this example, the congestion detection module 111 can detect the bandwidth of the ingress port IP1. The ingress port IP1 can be in a congested state or a non-congested state (smooth state), and the congested state and the smooth state are mutually exclusive.

In some embodiments, when the congestion detection module 111 determines that a bandwidth of the packet flow F1 and the packet flow F3 is greater than a bandwidth threshold for N times (N is a positive integer), the ingress port IP1 enters the congested state. On the contrary, when the congestion detection module 111 determines that the bandwidth of the packet flow F1 and the packet flow F3 is equal to or less than the bandwidth threshold for M times (M is a positive integer, M can be equal to or different from N), the ingress port IP1 enters the non-congested state.

In some embodiments, when the congestion detection module 111 determines that the bandwidth of the packet flow F1 and the packet flow F3 in a time interval is greater than a bandwidth threshold, the ingress port IP1 enters the congested state. On the contrary, when the congestion detection module 111 determines that the bandwidth of the packet flow F1 and the packet flow F3 in the time interval is equal to or less than the bandwidth threshold, the ingress port IP1 enters the non-congested state.

When the congestion detection module 111 determines that the ingress port IP1 is in the congested state, the bandwidth allocation module 112 can start to perform the suppression processes. The "suppression process" hereafter can be implemented by dropping the packets or storing the packets in the queues temporarily, but the present disclosure is not limited to these acts.

For example, the bandwidth allocation module 112 can perform a first suppression process on the packet flow F1 with the lower priority at the ingress port IP1.

After the first suppression process, the coordination detection module 113 can determine coordination of the first suppression process. The "coordination" can reflect outcome of the suppression result. For example, when a difference value between an actual bandwidth after a suppression process and a target bandwidth is greater than a threshold value, it represents that the suppression process is with a lower coordination (poor suppression effect). When a difference value between an actual bandwidth after a suppression process and a target bandwidth is equal to or less than the threshold value, it represents that the suppression process is with a higher coordination (good suppression effect). The aforementioned difference value can be called as steady state error.

When the coordination detection module 113 determines that the first suppression process is with a lower coordination, the coordination detection module 113 notifies the bandwidth allocation module 114. Then, the bandwidth allocation module 114 can perform a second suppression process on the packet flow F2 with the same lower priority at the egress port EP2.

In this example, the packet flow F1 and the packet flow F2 are FTP and FTP belongs to one kind of request-reply protocol. In other words, the packet flow F1 can be replies of FTP, and the packet flow F2 can be requests of FTP. In other words, the first suppression process can limit the flow of the replies of FTP, and the second suppression process can limit the flow of the requests of FTP.

After the second suppression process, if the ingress port IP1 is still in the congested state, the bandwidth allocation module 112 can perform a third suppression process on the packet flow F3 with the higher priority at the ingress port IP1.

After the third suppression process, when the coordination detection module 113 determines that the third suppression process is with a lower coordination, the coordination detection module 113 notifies the bandwidth allocation module 114 again. Then, the bandwidth allocation module 114 can perform a fourth suppression process on the packet flow F4 with the higher priority at the egress port EP2.

In this example, the packet flow F3 and the packet flow F4 are VoIP and VoIP belongs to one kind of request-reply protocol. In other words, the packet flow F3 can be replies of VoIP, and the packet flow F4 can be requests of VoIP. In other words, the third suppression process can limit the flow of the replies of VoIP, and the fourth suppression process can limit the flow of the requests of VoIP.

In some embodiments, the suppression processes can be performed gradually. For example, the packet flows F1-F4 have corresponding lower bandwidth limits respectively. In the first suppression process, the bandwidth allocation module 112 gradually decreases the bandwidth of the packet flow F1 at the ingress port IP1 by a ratio. Until the bandwidth of the packet flow F1 is decreased to its corresponding lower bandwidth limit, the bandwidth allocation module 114 performs the next suppression process. The second suppression process, the third suppression process, and the fourth suppression process have similar operations, so they are not described herein again. The aforementioned ratio is a positive number less than 1, and can be preset or can be adjusted dynamically.

However, when the congestion detection module 111 determines that the ingress port IP1 is in the non-congested state, the bandwidth allocation module 112 and the bandwidth allocation module 114 perform release processes. The "release process" hereafter can be implemented by not doing the aforementioned acts (e.g., not dropping the packets or not storing the packets in the queues temporarily), but the present disclosure is not limited to these acts.

The order of the release processes can be a reverse of the order of the suppression processes. For example, the bandwidth allocation module 114 can perform a first release process on the packet flow F4 at the egress port EP2. Then, the bandwidth allocation module 112 can perform a second release process on the packet flow F3 at the ingress port IP1. Then, the bandwidth allocation module 114 can perform a third release process on the packet flow F2 at the egress port EP2. Then, the bandwidth allocation module 112 can perform a fourth release process on the packet flow F1 at the ingress port IP1.

In some embodiments, the release processes can be performed gradually. For example, the packet flows F1-F4 have corresponding upper bandwidth limits respectively. In the first release process, the bandwidth allocation module 114 gradually increases the bandwidth of the packet flow F4 at the egress port EP2 by a ratio. Until the bandwidth of the packet flow F4 is increased to its corresponding upper bandwidth limit, the bandwidth allocation module 112 performs the next release process. The second release process, the third release process, and the fourth release process have similar operations, so they are not described herein again. The aforementioned ratio is greater than 1, and can be preset or can be adjusted dynamically.

By the suppression processes above and the release processes above, the bandwidth of the packet processing device 100 can be appropriately adjusted to solve the network congestion problems.

It is noted that positions of the congestion detection module 111, the bandwidth allocation module 112, the coordination detection module 113, and the bandwidth allocation module 114 and coupling relationships between congestion detection module 111, the bandwidth allocation module 112, the coordination detection module 113, and the bandwidth allocation module 114 in FIG. 1 are only for the convenience of describing the embodiments above and are not intended to limit the present disclosure.

In the embodiments above, the two directions (from the server S to the client C, from the client C to the server S) of the packet flow F1 and the packet flow F2 with the lower priority are suppressed first. After finishing the suppression processes on the packet flow F1 and the packet flow F2, the two directions of the packet flow F3 and the packet flow F4 with the higher priority are suppressed.

However, in some other embodiments, one direction (from the server S to the client C) of the packet flow F1 and the packet flow F3 with the different priorities is suppressed first. After finishing the suppression processes on the packet flow F1 and the packet flow F3, another direction (from the client C to the server S) of the packet flow F2 and the packet flow F4 with the different priorities is suppressed.

For example, after the bandwidth allocation module 112 performs the first suppression process on the packet flow F1 with the lower priority at the ingress port IP1, the bandwidth allocation module 112 performs the second suppression process on the packet flow F3 with the higher priority at the ingress port IP1. After the second suppression process, the bandwidth allocation module 114 performs the third suppression process on the packet flow F2 with the lower priority at the egress port EP2. After the third suppression process, the bandwidth allocation module 114 performs the fourth suppression process on the packet flow F4 with the higher priority at the egress port EP2.

Similarly, when the congestion detection module 111 determines that the ingress port IP1 is in the non-congested state, the bandwidth allocation module 112 and the bandwidth allocation module 114 start to perform the release processes. The order of the release processes can be a reverse of the order of the suppression processes. For example, the bandwidth allocation module 114 performs the first release process on the packet flow F4 at the egress port EP2. Then, the bandwidth allocation module 114 performs the second release process on the packet flow F2 at the egress port EP2. Then, the bandwidth allocation module 112 performs the third release process on the packet flow F3 at the ingress port IP1. Then, the bandwidth allocation module 112 performs the fourth release process on the packet flow F1 at the ingress port IP1.

In some embodiments, the suppression processes above and the release processes above can be performed gradually. The details about the term "gradually" are described in the embodiments above, so they are not described herein again.

In the embodiments above, the congestion detection module 111, the bandwidth allocation module 112, and the coordination detection module 113 act on the ingress port IP1, and the bandwidth allocation module 114 acts on the egress port EP2. In some other embodiments, the congestion detection module 111, the bandwidth allocation module 112, and the coordination detection module 113 can act on the ingress port IP2, and the bandwidth allocation module 114 can act on the egress port EP1.

In addition, although the egress port EP1 in the embodiments of FIG. 1 merely receives the packet flows from one ingress port (e.g., the ingress port IP1), the egress port EP1 can receive the packet flows from multiple ingress ports in other embodiments. In these other embodiments, the bandwidth allocation module 114 can perform the bandwidth allocation process for the multiple ingress ports.

In addition, in some embodiments, the bandwidth allocation module 112 can perform the suppression processes on the packet flow F1 with the lower priority and the packet flow F3 with the higher priority at the ingress port IP1 simultaneously at first. Then, the bandwidth allocation module 114 can perform the suppression processes on the packet flow F2 with the lower priority and the packet flow F4 with the higher priority at the egress port EP2 simultaneously. However, a suppression weighting mechanism can be used in these embodiments. When a suppression weighting value of the flow is greater, more flow is suppressed. When a suppression weighting value of the flow is less, less flow is suppressed. For example, the bandwidth allocation module 112 can utilize a first suppression weighting value to perform the suppression process on the packet flow F1 with the lower priority at the ingress port IP1, and utilize a second suppression weighting value less than the first suppression weighting value to perform the suppression process on the packet flow F3 with the higher priority at the ingress port IP1 simultaneously. Similarly, the bandwidth allocation module 114 can utilize a third suppression weighting value to perform the suppression process on the packet flow F2 with the lower priority at the egress port EP2, and utilize a fourth suppression weighting value less than the third suppression weighting value to perform the suppression process on the packet flow F4 with the higher priority at the egress port EP2 simultaneously.

In some related approaches, the bandwidth is occupied by a specific packet flow or the packet processing device drops packets in a random way, resulting in unstable transmission. In addition, in some related approaches, capacities of queues are set to be larger, resulting in buffer bloat problems.

Compared to the aforementioned related approaches, the present disclosure can detect the congested state of the packet processing device 100 and perform the suppression processes or the release processes for different packet flows dynamically to control the bandwidth more efficiently. In some embodiments, the suppression processes or the release processes are performed gradually to avoid too drastic changes and achieve better user experience.

Figure 2:
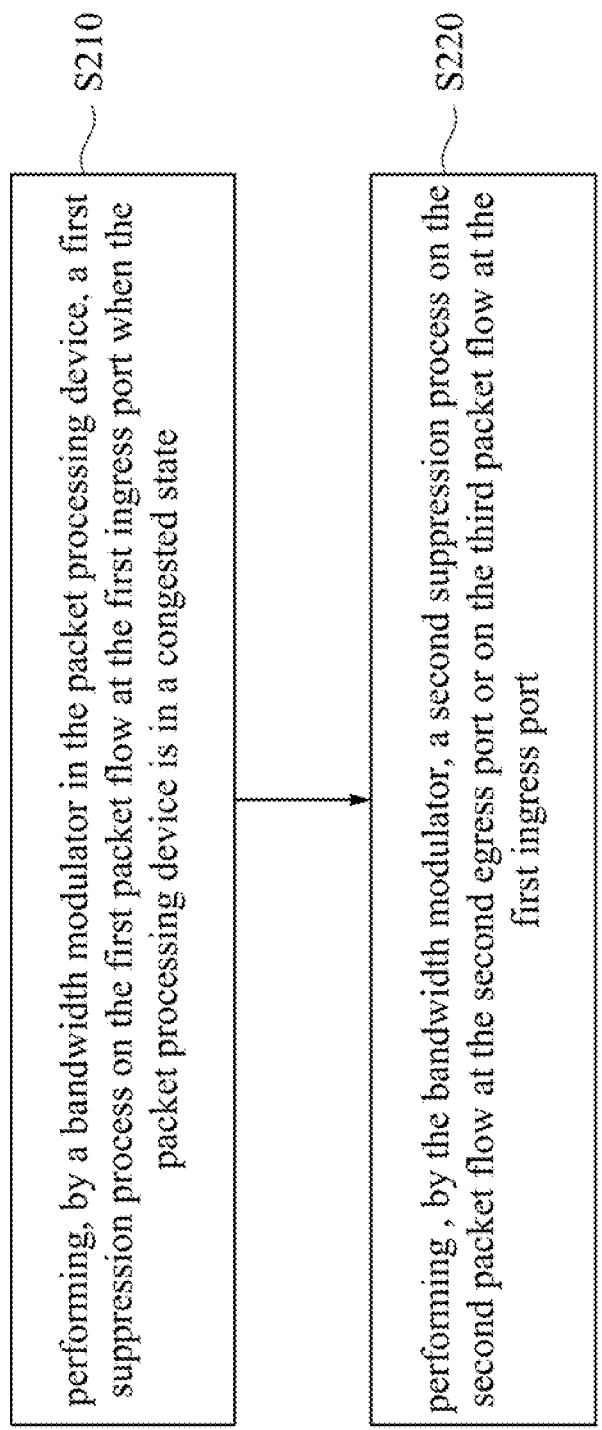
FIG. 2 is a flow diagram of a packet processing method according to some embodiments of the present disclosure.

Reference is made to FIG. 2. FIG. 2 is a flow diagram of a packet processing method 200 according to some embodiments of the present disclosure. As illustrated in FIG. 2, the packet processing method 200 includes operation S210 and operation S220.

In some embodiments, the packet processing method 200 can be applied to the packet processing device 100 in FIG. 1, but the present disclosure is not limited thereto. For better understanding, the packet processing method 200 is described in following paragraphs with reference to the packet processing device 100 in FIG. 1.

In operation S210, when the packet processing device 100 is in the congested state, the bandwidth modulator 110 performs the first suppression process on the packet flow F1 at the ingress port IP1. In some embodiments, the ingress port IP1 is a WAN port, but the present disclosure is not limited thereto.

In operation S220, the bandwidth modulator 110 performs the second suppression process on the packet flow F2 at the egress port EP2 or on the packet flow F3 at the ingress port IP1. In some embodiments, the egress port EP2 is also a WAN port.

Other details about the packet processing method 200 are described in the embodiments above, so they are not described herein again.

As described above, the present disclosure can detect the congested state of the packet processing device and perform the suppression processes or the release processes for different packet flows dynamically to control the bandwidth more efficiently.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A packet processing device, comprising:
   a first ingress port;
   a second ingress port;
   a first egress port;
   a second egress port, wherein a first packet flow and a second packet flow support a first protocol, a third packet flow and a fourth packet flow support a second protocol, and a priority of the first protocol is lower than a priority of the second protocol, wherein the first packet flow and the third packet flow are transmitted from the first ingress port to the first egress port, and the second packet flow and the fourth packet flow are transmitted from the second ingress port to the second egress port; and
   a bandwidth modulator, wherein when the packet processing device is in a congested state, the bandwidth modulator performs a first suppression process on the first packet flow at the first ingress port, and the bandwidth modulator performs a second suppression process on the second packet flow at the second egress port or on the third packet flow at the first ingress port,
   wherein when the bandwidth modulator performs the first suppression process, the bandwidth modulator gradually decreases a bandwidth of the first packet flow at the first ingress port, wherein until the bandwidth of the first packet flow is equal to a lower bandwidth limit, the bandwidth modulator performs the second suppression process.

2. The packet processing device of claim 1, wherein after the first suppression process, the bandwidth modulator performs the second suppression process on the second packet flow at the second egress port.

3. The packet processing device of claim 2, wherein after the first suppression process, when a difference value between a first actual bandwidth after the first suppression process and a first target bandwidth is greater than a first threshold value, the bandwidth modulator performs the second suppression process on the second packet flow at the second egress port,
   wherein when the packet processing device is still in the congested state after the second suppression process, the bandwidth modulator performs a third suppression process on the third packet flow at the first ingress port.

4. The packet processing device of claim 3, wherein when a difference value between a second actual bandwidth after the third suppression process and a second target bandwidth is greater than a second threshold value, the bandwidth modulator performs a fourth suppression process on the fourth packet flow at the second egress port.

5. The packet processing device of claim 4, wherein when the packet processing device is in a non-congested state, the bandwidth modulator performs a first release process on the fourth packet flow at the second egress port,
   wherein after the first release process, the bandwidth modulator performs a second release process on the third packet flow at the first ingress port.

6. The packet processing device of claim 5, wherein after the second release process, the bandwidth modulator performs a third release process on the second packet flow at the second egress port,
   wherein after the third release process, the bandwidth modulator performs a fourth release process on the first packet flow at the first ingress port.

7. The packet processing device of claim 5, wherein when the bandwidth modulator determines that a bandwidth of the first packet flow and the third packet flow is greater than a bandwidth threshold for N times, the packet processing device enters the congested state, wherein N is a positive integer,
   wherein when the bandwidth modulator determines that the bandwidth of the first packet flow and the third packet flow is equal to or less than the bandwidth threshold for M times, the packet processing device enters the non-congested state, wherein M is a positive integer.

8. The packet processing device of claim 5, wherein when the bandwidth modulator determines that a bandwidth of the first packet flow and the third packet flow in a time interval is greater than a bandwidth threshold, the packet processing device enters the congested state,
   wherein when the bandwidth modulator determines that the bandwidth of the first packet flow and the third packet flow in the time interval is equal to or less than the bandwidth threshold, the packet processing device enters the non-congested state.

9. The packet processing device of claim 5, wherein when the bandwidth modulator performs the first release process, the bandwidth modulator gradually increases a bandwidth of the fourth packet flow at the second egress port, wherein until the bandwidth of the fourth packet flow is equal to an upper bandwidth limit, the bandwidth modulator performs the second release process.

10. The packet processing device of claim 1, wherein after the first suppression process, the bandwidth modulator performs the second suppression process on the third packet flow at the first ingress port,
    wherein after the second suppression process, the bandwidth modulator performs a third suppression process on the second packet flow at the second egress port,
    wherein after the third suppression process, the bandwidth modulator performs a fourth suppression process on the fourth packet flow at the second egress port.

11. The packet processing device of claim 1, wherein the first ingress port and the second egress port are Wide Area Network ports, and the first egress port and the second ingress port are Local Area Network ports.

12. The packet processing device of claim 1, wherein the first protocol and the second protocol are request-reply protocols.

13. The packet processing device of claim 1, wherein the bandwidth modulator utilizes a suppression weighting mechanism to perform the first suppression process on the first packet flow at the first ingress port and perform the second suppression process on the third packet flow at the first ingress port simultaneously.

14. A packet processing method, applied to a packet processing device, wherein the packet processing device comprises a first ingress port, a second ingress port, a first egress port, and a second egress port, wherein a first packet flow and a second packet flow support a first protocol, a third packet flow and a fourth packet flow support a second protocol, and a priority of the first protocol is lower than a priority of the second protocol, wherein the first packet flow and the third packet flow are transmitted from the first ingress port to the first egress port, and the second packet flow and the fourth packet flow are transmitted from the second ingress port to the second egress port, wherein the packet processing method comprises:
  performing, by a bandwidth modulator in the packet processing device, a first suppression process on the first packet flow at the first ingress port when the packet processing device is in a congested state; and
  performing, by the bandwidth modulator, a second suppression process on the second packet flow at the second egress port or on the third packet flow at the first ingress port,
  wherein when the bandwidth modulator performs the first suppression process, the bandwidth modulator gradually decreases a bandwidth of the first packet flow at the first ingress port, wherein until the bandwidth of the first packet flow is equal to a lower bandwidth limit, the bandwidth modulator performs the second suppression process.

15. The packet processing method of claim 14, further comprising:
  performing, by the bandwidth modulator, the second suppression process on the second packet flow at the second egress port after the first suppression process.

16. The packet processing method of claim 14, further comprising:
  performing, by the bandwidth modulator, the second suppression process on the third packet flow at the first ingress port after the first suppression process.

17. The packet processing method of claim 14, wherein the bandwidth modulator utilizes a suppression weighting mechanism to perform the first suppression process on the first packet flow at the first ingress port and perform the second suppression process on the third packet flow at the first ingress port simultaneously.

18. The packet processing method of claim 14, wherein the first ingress port and the second egress port are Wide Area Network ports, the first egress port and the second ingress port are Local Area Network ports, and the first protocol and the second protocol are request-reply protocols.

* * * * *